United States Patent
Parizek et al.

(10) Patent No.: US 9,581,216 B2
(45) Date of Patent: Feb. 28, 2017

(54) TENSIONING DEVICE AND COMPONENT HAVING SUCH A TENSIONING DEVICE

(71) Applicant: Hemscheidt Fahrwerktechnik GmbH & Co. KG, Haan (DE)

(72) Inventors: Markus Parizek, Mettman (DE); Mark Woehrmann, Hilden (DE)

(73) Assignee: Hemscheidt Fahrwerktechnik GmbH & Co. KG, Haan (DE)

( * ) Notice: Subject to any disclaimer, the term of this patent is extended or adjusted under 35 U.S.C. 154(b) by 0 days.

(21) Appl. No.: 14/605,011

(22) Filed: Jan. 26, 2015

(65) Prior Publication Data

US 2015/0211594 A1 Jul. 30, 2015

(30) Foreign Application Priority Data

Jan. 29, 2014 (DE) ........................ 10 2014 001 192

(51) Int. Cl.
*F16F 9/06* (2006.01)
*F16H 7/08* (2006.01)
*F16H 7/10* (2006.01)

(52) U.S. Cl.
CPC ............... *F16F 9/062* (2013.01); *F16H 7/08* (2013.01); *F16H 7/10* (2013.01); *F16H 2007/0812* (2013.01)

(58) Field of Classification Search
CPC .... F16F 9/062; F16F 9/06; F16F 9/063; F16F 9/066; F16F 9/067; F16F 9/092

(Continued)

(56) References Cited

U.S. PATENT DOCUMENTS 3,993,294 A * 11/1976 Wossner ................. F16F 9/362
188/269
4,341,857 A * 7/1982 Aoki ........................ G03C 8/42
430/207

(Continued)

FOREIGN PATENT DOCUMENTS

DE 37 29 445 C2 7/1990
DE 39 10 119 A1 10/1990

(Continued)

OTHER PUBLICATIONS

EPO machine translation of FR 2936579 A1, Glasson, Apr. 2010.*

(Continued)

*Primary Examiner* — Thomas J Williams
(74) *Attorney, Agent, or Firm* — Collard & Roe, P.C.

(57) ABSTRACT

A tensioning device for applying a tensioning force to a component has a cylinder housing having a hydraulic medium filled axial cylinder, a piston rod guided in the cylinder recess telescoping in a longitudinal axis direction, and displaceable back and forth, projecting out of the cylinder housing at one end, a piston guided in an axial piston rod recess, and displaceable, back and forth, by a limited amount, in the longitudinal axis direction, from a moved-in position to a moved-out position, and a spring element connected with the piston driving the piston in an outward piston movement direction parallel to the longitudinal axis. Force is applied to the piston by the spring element and by the hydraulic medium, so that inward movement of the piston rod into the cylinder housing (8), in the inward piston rod movement direction (77), brings about inward movement of the piston into the piston rod.

22 Claims, 6 Drawing Sheets

(58) Field of Classification Search
USPC .............. 267/64.26, 117, 118, 121, 124
See application file for complete search history.

(56) References Cited

U.S. PATENT DOCUMENTS

| | | | | | |
|---|---|---|---|---|---|
| 4,428,567 | A | * | 1/1984 | Fournales | F16F 9/063 |
| | | | | | 188/269 |
| 4,995,597 | A | * | 2/1991 | Hatton | F16F 9/063 |
| | | | | | 188/269 |
| 5,024,465 | A | * | 6/1991 | Baiker | B60G 9/04 |
| | | | | | 267/64.13 |
| 5,046,755 | A | | 9/1991 | Runkel et al. | |
| 5,443,146 | A | * | 8/1995 | Ayyildiz | F16F 9/063 |
| | | | | | 188/371 |
| 5,586,781 | A | * | 12/1996 | Anderson | B60G 17/0152 |
| | | | | | 267/64.17 |
| 5,653,425 | A | * | 8/1997 | Page | F16F 9/063 |
| | | | | | 188/269 |
| 6,543,425 | B2 | * | 4/2003 | Mayer | F02M 37/18 |
| | | | | | 123/495 |
| 2013/0233628 | A1 | | 9/2013 | Moser | |

FOREIGN PATENT DOCUMENTS

| | | | | |
|---|---|---|---|---|
| DE | 10 2010 045 877 | A1 | 3/2012 | |
| EP | 1657470 | A1 * | 5/2006 | ........... F16F 9/063 |
| EP | 2 644 932 | A1 | 10/2013 | |
| ES | 2 221 533 | A1 | 12/2004 | |
| FR | 2 145 778 | A5 | 2/1973 | |
| FR | 2936579 | A1 * | 4/2010 | ........... B60G 15/12 |

OTHER PUBLICATIONS

German Office Action dated Dec. 4, 2014 in German Application No. 10 2014 001 192.5 with English translation of the relevant parts.

* cited by examiner

TENSIONING DEVICE AND COMPONENT HAVING SUCH A TENSIONING DEVICE

CROSS REFERENCE TO RELATED APPLICATIONS

Applicant claims priority under 35 U.S.C. §119 of German Application No. 10 2014 001 192.5 filed on Jan. 29, 2014, the disclosure of which is incorporated by reference.

The present invention relates to a tensioning device for applying a tensioning force $F_X$ to an object or component to be tensioned, particularly to a press-down or deflection roller, as well as to a component having such a tensioning device.

Such a tensioning device is known, for example, from EP 2 644 932 A1. This tensioning device has a cylinder housing having a piston displaceably guided in it, which piston has a gas pressure spring applied to it. The cylinder housing serves for attaching the tensioning device to a fixed counter-bearing. Furthermore, the tensioning device has a piston rod that projects out of the cylinder housing and serves for attachment to the component to which the force is to be applied. The piston rod is also displaceably mounted in the cylinder housing and rigidly stands in connection with the piston. To set the length of the tensioning device, the distance between piston rod and piston is adjustable, particularly by way of a hydraulic medium. According to EP 2 644 932 A1, the spring force $F_Y$ generated by the gas pressure spring is at least as great, in this connection, as the tensioning force $F_X$. As a result, the tensioning device does not change its length, at first, in the case of an overload. Only once the spring force $F_Y$ has been exceeded is the piston rod moved into the cylinder housing.

A tensioning device of the stated type, having a cylinder housing, is also evident from DE 37 29 445 C2. A piston is displaceably disposed within the cylinder housing. A piston rod is displaceably guided within the cylinder housing and projects out of the cylinder housing. Within the piston rod, a gas space is present, whereby the gas is tensioned by means of a separating piston displaceably mounted within the piston rod. The separating piston separates the gas space from a hydraulic space filled with a hydraulic medium. The hydraulic space is delimited by the cylinder housing and the piston.

FR 2 145 778 also discloses a tensioning device of the stated type, having a cylinder housing. Within the cylinder housing, a piston rod is displaceably disposed and projects out of the cylinder housing. A piston is displaceably guided within the piston rod. Within the piston rod, a gas space is present. The piston separates the gas space from a hydraulic space filled with a hydraulic medium. The hydraulic space is delimited by the cylinder housing and the piston rod. Adjustment and regulation of the tensioning force takes place by means of a control device, by means of which hydraulic medium is supplied or discharged.

It is the object of the present invention to make available a tensioning device for applying a tensioning force $F_X$ to an object or component tensioned, particularly a press-down or deflection roller, which device is supposed to have the lowest possible minimal construction length and great functional reliability. A further object is to make available a component having such a tensioning device.

This object is accomplished by means of a tensioning device according to one aspect of the invention and a component according to another aspect of the invention. Advantageous further developments of the invention are indicated in the subsequent discussion.

In the following, the invention will be explained in greater detail using a drawing as an example. This shows.

Figure 1:
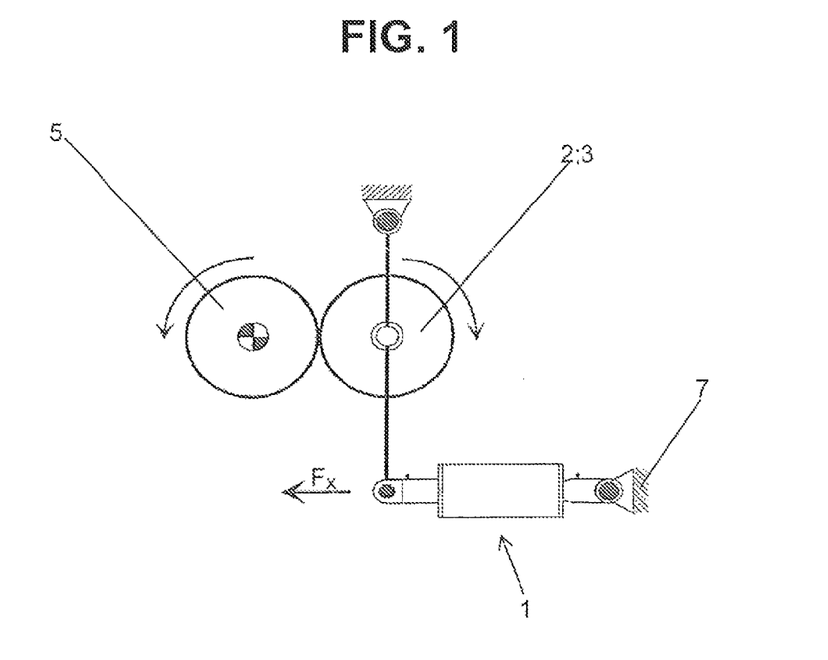
FIG. 1: A schematic side view of a press-down roller having a tensioning device according to the invention
Figure 2:
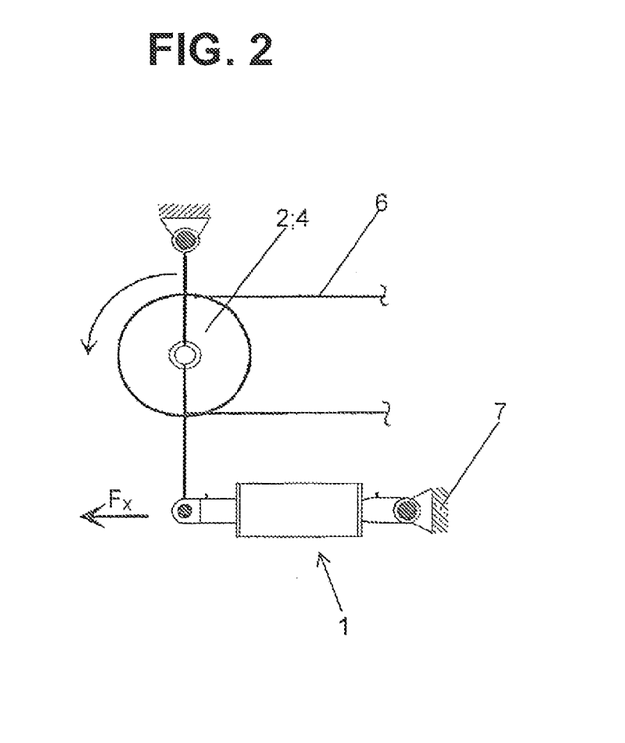
FIG. 2: A schematic side view of a deflection roller having a tensioning device according to the invention
Figure 6:
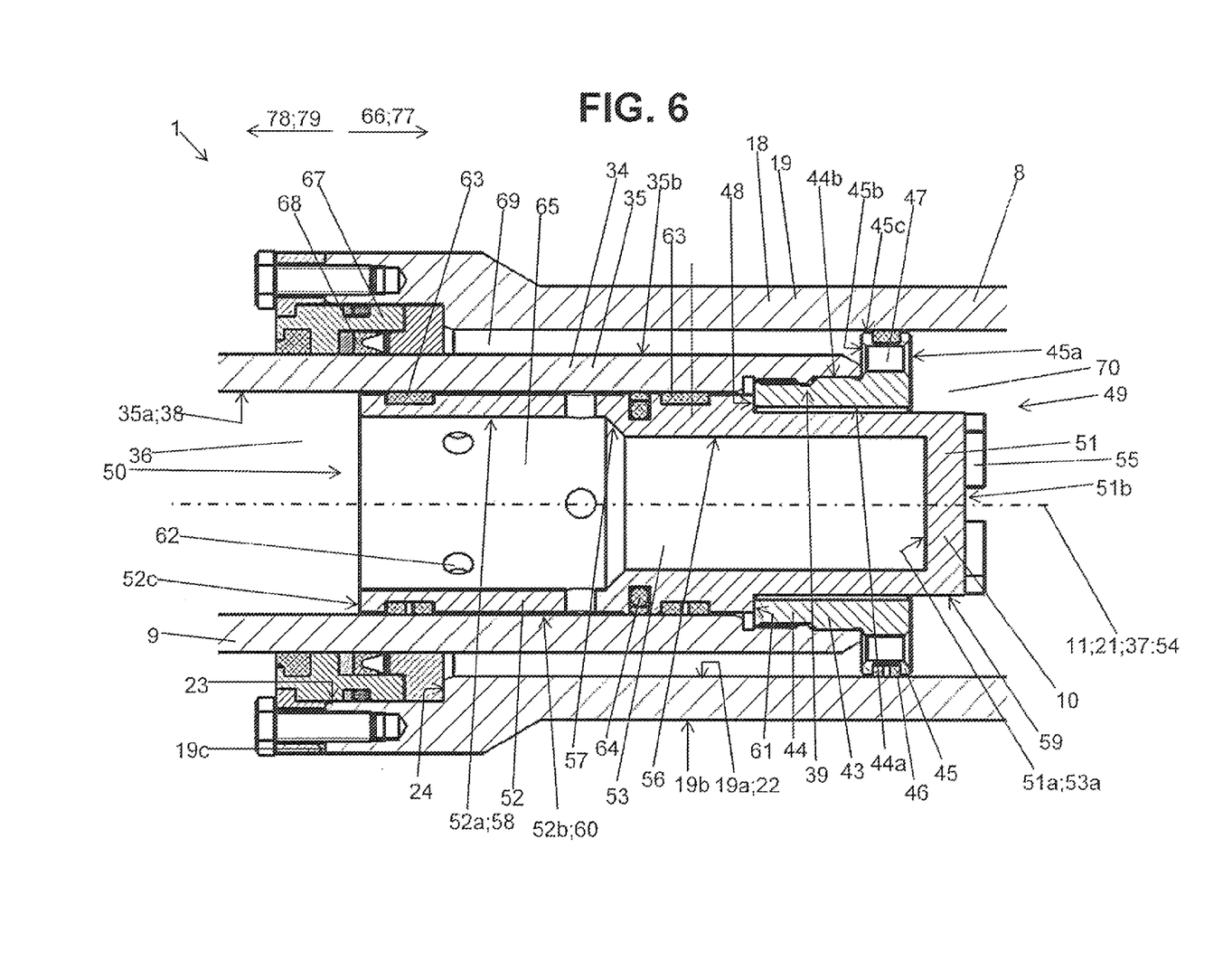
FIG. 6: An enlarged partial detail of the longitudinal section according to FIG. 3
Figure 7:
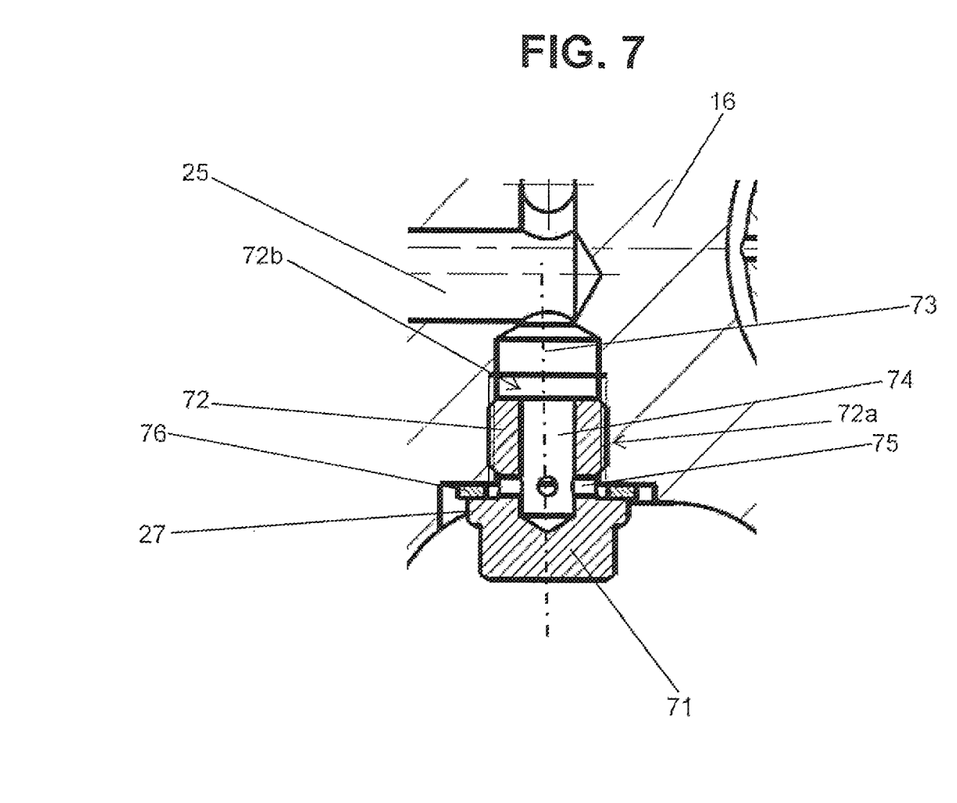

FIG. 7: An enlarged partial detail of the longitudinal section according to FIG. 3 in the region of a closure screw The tensioning device 1 according to the invention, particularly a hydropneumatic device (FIGS. 1-7), serves for applying a tensioning force $F_X$ to an object or component 2. The component 2 can be, for example, a press-down roller 3 (FIG. 1) or a deflection roller 4 (FIG. 2). The press-down roller 3 is pressed against a counter-roller 5 that rotates in the opposite direction of the press-down roller 3, by means of the tensioning device 1. The deflection roller 4 serves for deflecting a driver 6, for example a belt or a chain, which is passed around the deflection roller 4. The driver 6 is tensioned by means of applying the tensioning force $F_X$ to the deflection roller 4. For this purpose, the tensioning device 1 stands in connection with the component 2 to which the force is to be applied, in other words the press-down roller 3 or the deflection roller 4, with one end, and with a supporting element 7 that is fixed in place relative to the component 2, with the other end.

The tensioning device 1 according to the invention. (FIGS. 3-7) has a cylinder housing 8, a piston rod 9 partially disposed within the cylinder housing 8, as well as a piston 10 guided in the piston rod 9, and a longitudinal or activation axis 11.

The cylinder housing 8 (FIGS. 3-6) has an attachment end 12 as well as an open housing end 13 that lies opposite the former in the direction of the longitudinal axis 11. At the attachment end 12, the cylinder housing 8 has a known attachment eyelet or a known attachment eye 14 for attaching the tensioning device 1 to the fixed supporting element 7. Preferably, an attachment bushing 15 is pressed into the attachment eye 14. The attachment eye 14 and the attachment bushing 15 serve for attaching the cylinder housing 8 to a supporting or counter-bearing element 7 that is fixed in place relative to the component 2 to which force is to be applied.

The attachment eye 14 is followed, viewed in the direction of the longitudinal axis 11, by a connection neck 16 that is preferably narrowed in comparison with the attachment eye 14. The connection neck 16 is followed, viewed in the direction of the activation axis 11, by a cylinder bottom wall 17 of a cylinder 18. The connection neck 16 is therefore disposed between the attachment eye 14 and the cylinder 18, particularly the cylinder bottom wall 17.

The cylinder 18, the connection neck 16, and the attachment eye 14 are preferably configured in one piece and preferably consist of metal, particularly of steel.

The cylinder 18 of the cylinder housing 8 has the cylinder bottom wall 17, a cylinder tube wall 19, as well as a cylinder recess or cylinder depression 20 and a cylinder axis 21 that runs coaxial to the longitudinal axis 11. The cylinder bottom wall 17 and the cylinder tube wall 19 delimit the cylinder recess 20. The cylinder tube wall 19 therefore follows the cylinder bottom wall 17 and stands away from this wall 17 in the direction of the cylinder axis 21. The cylinder tube wall 19 is preferably configured with rotation symmetry relative to the cylinder axis 21. The cylinder bottom wall 17 has a bottom wall inner surface 17a, particularly a planar surface, which forms a recess bottom 20a of the cylinder recess 20. The cylinder recess 20 is therefore open toward the open housing end 13 and closed toward the attachment end 12, in other words open on one side. The cylinder tube wall 19 is preferably configured to be circular-cylindrical and has an inner tube wall surface 19a and an outer tube wall surface 19b, as well as a tube wall face surface 19c. The tube wall face surface 19c is disposed at the open housing end 13.

The inner tube wall surface 19a delimits the cylinder recess 20. The inner tube wall surface 19a, in the direction of the longitudinal axis 11, viewed proceeding from the cylinder bottom wall 17, at first has a circular-cylindrical piston rod guide surface 22, which serves to guide the piston rod 9, as will be discussed in greater detail below. The piston rod guide surface 22 is followed by a bearing surface 23, which is also circular-cylindrical, the diameter of which is greater than the diameter of the piston rod guide surface 22. As a result, the piston rod guide surface 22 and the bearing surface 23 make a transition into one another by way of a ring step or a ring-shaped, planar step surface 24.

The cylinder housing 8 furthermore has a filling channel 25 that serves for filling the cylinder recess 20 with a hydraulic medium. The filling channel 25 at first extends perpendicular to the activation axis 11, from the outside, into the connection neck 16, and then parallel to the activation axis 11, through the cylinder bottom wall 17, until it ends in the cylinder recess 20. At the outer end of the filling channel 25, furthermore not only a lubrication nipple 26 for connecting a hydraulic medium press but also a closure and emptying screw 27 are present.

The closure and emptying screw 27 (FIGS. 3 and 7) has a screw head 71 as well as a screw shaft 72 and a screw axis 73. Furthermore, the closure and emptying screw 27 has a longitudinal channel 74 that extends parallel to the screw axis 73, and at least one, preferably multiple transverse channels 75 that extend perpendicular to this axis 73. The longitudinal channel 74 extends from the free shaft end 72b of the screw shaft 72 to the screw head 71, and somewhat into the latter. The transverse channels 75 are disposed below the screw head 71 and connected with the longitudinal channel 74. Furthermore, the transverse channels 75 open to the outside or the environment at an outer shaft surface 72a. They stand in fluidic connection with the environment. Furthermore, a sealing disk 76 is present between the screw head 71 and the cylinder housing 8. This design of the closure and emptying screw 27 guarantees that this screw 27 does not need to be unscrewed completely when draining the hydraulic medium, but rather only by a few screw threads. The hydraulic medium is drained through the longitudinal channel 74 and the transverse channels 75, as soon as the transverse channels 75 are clear. The longitudinal channel 74 and the transverse channels 75 therefore form a channel line for the hydraulic medium. In the case of a conventional closure and emptying screw, the problem frequently occurs that the screw is pressed out while it is being unscrewed, because of the great pressure of the hydraulic medium. This is prevented by the closure and emptying screw 27 for closing a bore that stands in fluidic connection with a space filled with a fluid that stands under pressure, Which screw is inventive on its own.

The piston rod 9 also has an attachment end 28 as well as an open rod end 29 that lies opposite to the former in the direction of the activation axis 11. At the attachment end 28, the piston rod 9 also has a known attachment eyelet or a known attachment eye 30 for attaching the tensioning device 1 to the component 2 to be tensioned. Preferably, once again, an attachment bushing 31 is pressed into the attachment eye 30. However, it also lies within the scope of the invention to attach the piston rod 9 to the supporting element 7 that is fixed in place relative to the component 2, and to attach the cylinder housing 8 to the component 2.

The attachment eye 30 is followed, viewed in the direction of the activation axis 11, by a connection neck 32. The connection neck 32 is followed, viewed in the direction of the activation axis 11, by a rod bottom wall 33 of a hollow rod 34. The connection neck 32 is therefore disposed between the attachment eye 30 and the hollow rod 34, particularly the rod bottom wall 33.

The hollow rod 34, the connection neck 32, and the attachment eye 30 are preferably configured in one piece and preferably consist of metal, particularly steel.

The hollow rod 34 has the rod bottom wall 33, a tubular rod wall 35, as well as an axial rod recess or rod depression 36, and a rod axis 37 coaxial to the activation axis 11. The rod bottom wall 33 and the tubular rod wall 35 delimit the rod recess 36. The rod recess 36 is open toward the open rod end 29 and closed toward the attachment end 28. The rod recess 36, like the cylinder recess 20, is therefore open on one side. The tubular rod wall 35 therefore follows the rod bottom wall 33 and stands away from it in the direction of the rod axis 37. The tubular rod wall 35 is preferably configured with rotation symmetry relative to the rod axis 37. The rod bottom wall 33 has a bottom wall inner surface 33a, particularly a planar surface, which forms the recess bottom 36a of the rod recess 36. The rod wall 35 is preferably configured as a circular cylinder, and has an inner tube wall surface 35a an outer tube wall surface 35b, as well as a tube wall face surface at the open rod end 29. The inner tube wall surface 35a delimits the rod recess 36. The inner tube wall surface 35a, seen in the direction of the rod axis 37, proceeding from the rod bottom wall 33, at first has a circular-cylindrical piston guide surface 38, which serves to guide the piston 10 and will be discussed in greater detail below. The piston guide surface 38 is followed by an attachment region 39 having an inside thread, the diameter of which is greater than the diameter of the guide surface 38. The outer tube wall surface 35b, in contrast, is preferably configured to be continuously circular-cylindrical, with a uniform diameter. The diameter of the outer tube wall surface 35b is furthermore less than the diameter of the piston rod guide surface 22.

The piston rod 9 furthermore also has a filling channel 40, which serves for filling the rod recess 36 with a compressible medium. The filling channel 40 extends, at first, perpendicular to the activation axis 11, from the outside into the connection neck 32, and then parallel to the activation axis 11 through the rod bottom wall 33, until it ends in the rod recess 36. At the outer end of the filling channel 40, there is a gas filling valve 42 covered with a cap 41.

The piston rod 9 furthermore has a guide bushing 43. The guide bushing 43 has a tubular bushing wall 44 having a circular-cylindrical inner bushing wall surface 44a and a outer bushing wall surface 44b (FIG. 6). The outer bushing wall surface 44b has an outside thread that corresponds to the inside thread of the attachment region 39 of the piston rod 9. The diameter of the inner bushing wall surface 44a is less than the diameter of the piston guide surface 38. Furthermore, the guide bushing 43 has a ring-shaped collar 45 at one end, which collar follows the bushing wall 44. The collar 45 stands away from the outer bushing wall surface 44b in the radial direction. Furthermore, the collar 45 has two collar surfaces 45a, 45b that lie opposite one another, as well as a circular-cylindrical collar circumference surface 45c, the diameter of which is slightly less than the diameter of the piston rod guide surface 22. A circumferential groove is present in the collar circumference surface 45c, which groove extends in the circumference direction, and a guide strip 46 is disposed in it. Furthermore, the collar 45 has multiple bores 47, adjacent to one another in the circumference direction, which bores extend from the first collar surface 45a to the second collar surface 45b, through the collar 45. At its end lying opposite the collar 45, the bushing wall 44 has a ring-shaped bushing contact surface 48, particularly a planar surface, which serves as a contact surface for the piston 10.

Figure 3:
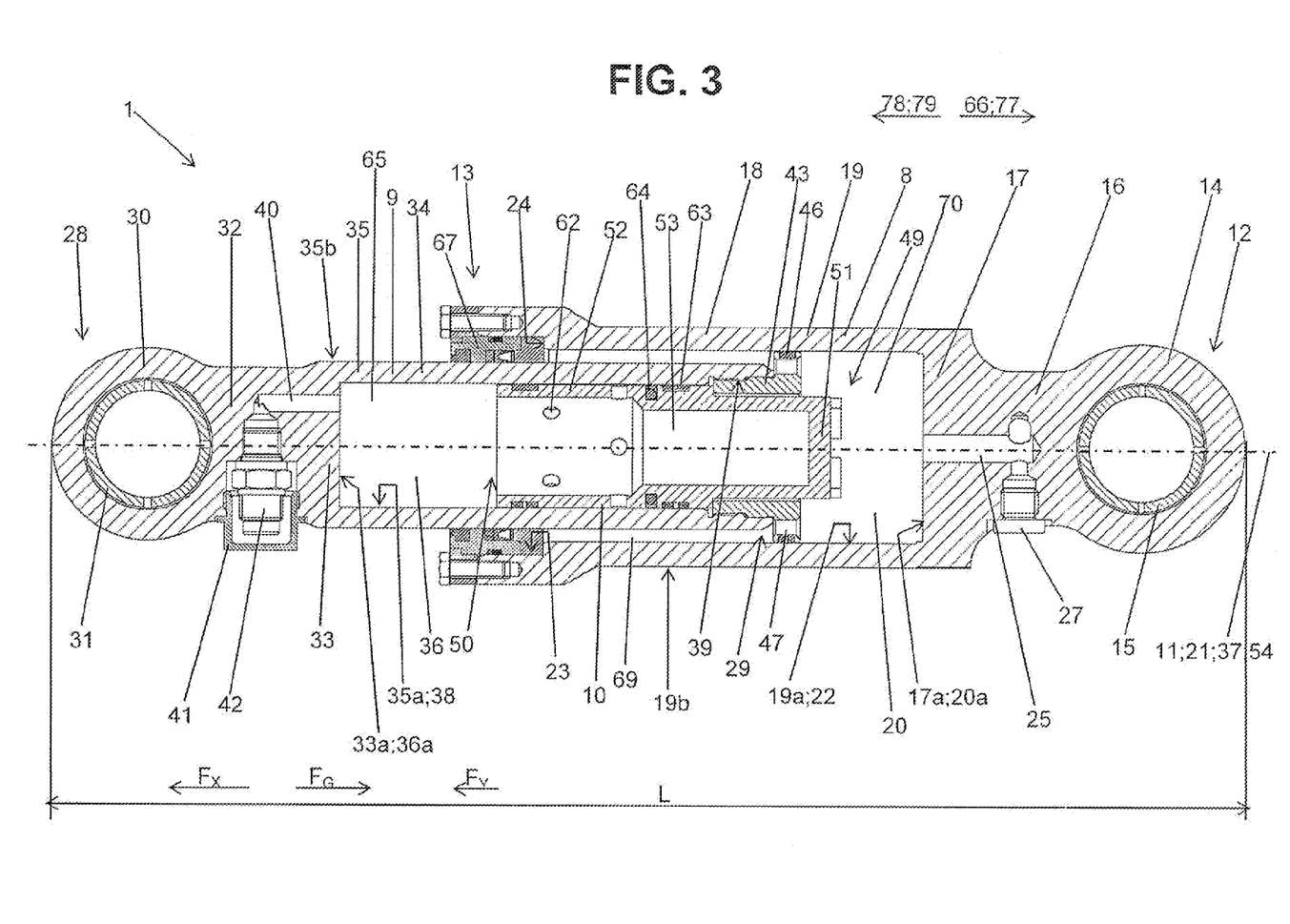
FIG. 3: A longitudinal section through a tensioning device according to the invention, having a medium length, in the normal operating position
Figure 5:
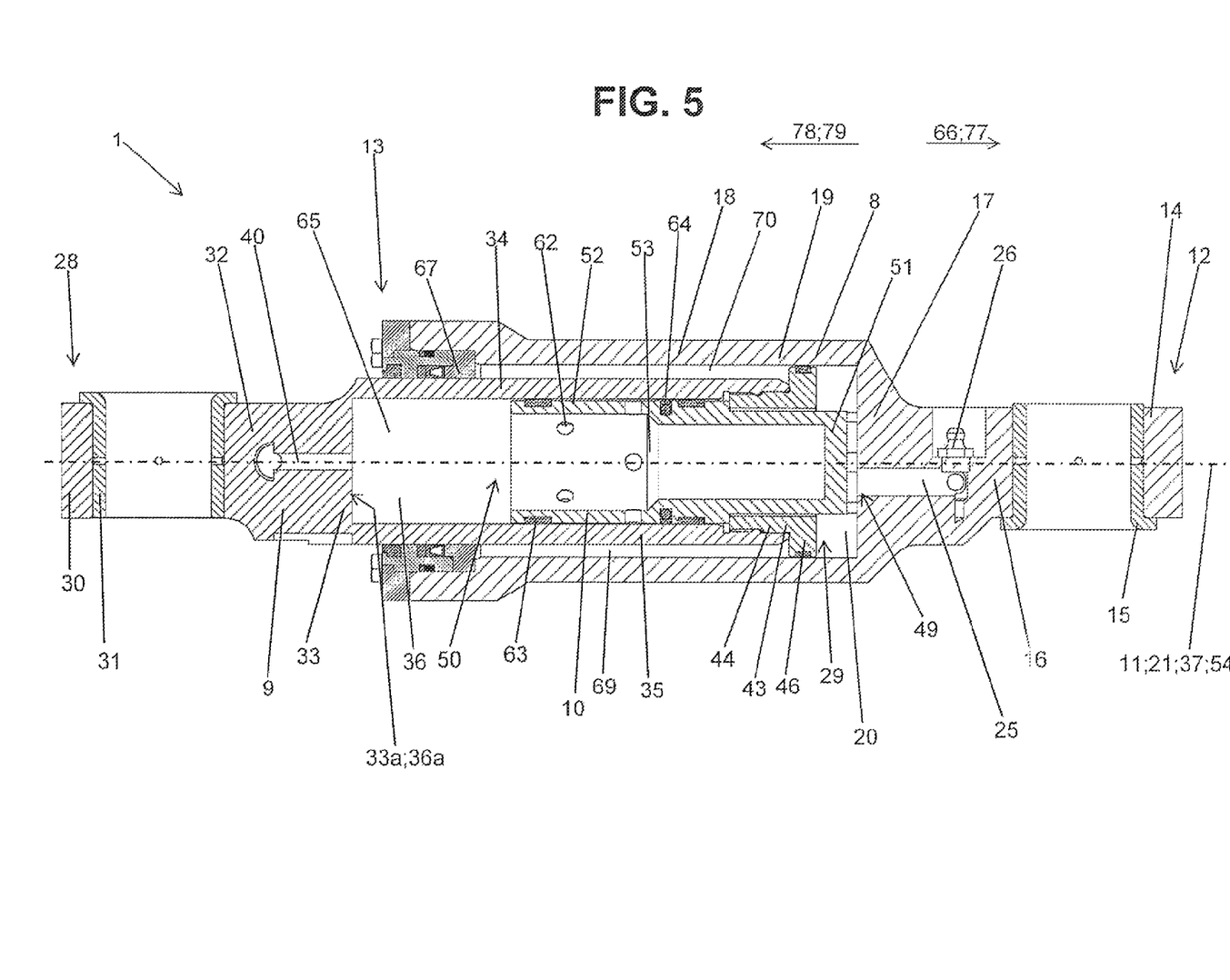
FIG. 5: A longitudinal section through the tensioning device according to the invention, rotated by 90° as compared with FIG. 3, with minimal length in the normal operating position

The guide bushing 43 is screwed into the attachment region 39 of the hollow rod 34 at the open rod end 29 of the piston rod 9, so that the second collar surface 45b lies against the face surface of the rod wall 35. Because the diameter of the inner bushing wall surface 44a is less than the diameter of the piston guide surface 38, the ring-shaped face surface 48 of the guide bushing 43 projects beyond the piston guide surface 38 radially inward, and forms the contact surface or the counter-bearing for the piston 10 in the maximally or completely moved-out position of the latter relative to the piston rod 9 (FIGS. 3, 5). Furthermore, the collar circumference surface 45c and the guide strip 46 project beyond the outer tube wall surface 35b of the rod wall 35 radially outward. The guide strip 46 lies against the piston rod guide surface 22 of the cylinder 18.

The piston 10 is configured to be cup-shaped or pot-shaped and has a closed piston end 49 and an open piston end 50 that lies opposite the former, viewed in the direction of the activation axis 11. The piston 10 furthermore has a piston bottom wall 51, a tubular piston wall 52, as well as a piston recess or piston depression 53, and a piston axis 54 coaxial to the activation axis 11. The tubular piston wall 52 and the piston bottom wall 51 are preferably configured in one piece and preferably consist of metal, particularly steel.

The piston bottom wall 51 is furthermore disposed at the closed piston end 49. The piston bottom wall 51 and the tubular piston wall 52 delimit the piston recess 53. The tubular piston wall 52 therefore follows the piston bottom wall 51 and stands away from it in the direction of the piston axis 54. The tubular piston wall 52 is configured with rotation symmetry relative to the Piston axis 54. The piston bottom wall 51 has an inner bottom wall surface 51a, particularly a planar surface, which forms a recess bottom 53a of the piston recess 53. In the direction of the piston axis 54, opposite the inner bottom wall surface 51a, the piston bottom wall 51 has an outer bottom wall surface 51b, particularly a planar surface. The piston furthermore has spacers 55 that follow the outer bottom wall surface 51b of the piston bottom wall 51, projecting away from the latter. The spacers 55 are particularly segments of a ring-shaped step that are disposed adjacent to one another in the circumference direction and are separated from one another by grooves. The spacers 55 serve to ensure that even at a minimal length of the tensioning device 1 in the moved-out Position of the piston 10 (FIG. 5), the outer bottom wall surface 51b of the piston bottom wall 51 stands away from the inner bottom wall surface 17a of the cylinder bottom wall 17. As a result, hydraulic medium can be passed into the cylinder recess 20 even in this position.

The tubular piston wall 52 has an inner tube wall surface 52a and an outer tube wall surface 52b, as well as a tube wall face surface 52c. The tube wall face surface 52c is disposed at the open piston end 50. The inner tube wall surface 52a delimits or encloses the piston recess 53. The piston recess 53 is therefore open toward the open piston end 50 and closed toward the closed piston end 49.

The inner tube wall surface 52a (FIG. 6) has a first circular-cylindrical surface section 56, at first, viewed in the direction of the piston axis 54, proceeding from the piston bottom wall 51. The first circular-cylindrical surface section 56 is followed by a conical or cone-shaped transition section 57, which is followed by a second circular-cylindrical surface section 58. The diameter of the second circular-cylindrical surface section 58 is greater than the diameter of the first circular-cylindrical surface section 56. Viewed in the direction of the piston axis 54, proceeding from the piston bottom wall 51, the piston recess 53 consequently widens.

The outer tube wall surface 52b, viewed in the direction of the piston axis 54, proceeding from the piston bottom wall 51, at first has a first circular-cylindrical surface section 59, the diameter of which is less than the diameter of the inner bushing wall surface 44a. The first circular-cylindrical surface section 59 is followed by a second circular-cylindrical surface section 60, the diameter of which is greater than the diameter of the first circular-cylindrical surface section 59. In particular, the diameter of the second circular-cylindrical surface section 60 is slightly less than the diameter of the piston guide surface 38. The first and second circular-cylindrical surface section 59; 60 make a transition into one another, by way of a planar, ring-shaped piston contact surface 61.

The piston 10 furthermore has multiple lubricant bores 62, which extend through the tubular piston wall 52. The lubricant bores 62 are preferably disposed in the region of the second circular-cylindrical surface section 58 of the inner tube wall surface 52a.

Furthermore, two circumferential grooves that extend in the circumference direction are present in the outer tube wall surface 52b, in which grooves a guide strip 63 is disposed, in each instance. In this connection, the two guide strips 63 are disposed in the region of the second surface section 60 and project slightly beyond the latter, outward in the radial direction. Furthermore, a further circumferential groove that extends in the circumference direction is present in the outer tube wall surface 52b, in which groove a sealing ring 64 is disposed. The sealing ring 64, viewed in the axial direction, is preferably disposed between the two guide strips 63.

In the following, the method of functioning of the tensioning device 1 according to the invention will now be explained in greater detail:

In the assembled state of the tensioning device 1 according to the invention, the piston 10 is mounted or guided within the piston rod 9, so as to be displaceable, back and forth, in the direction of the longitudinal axis 11, by a limited amount. The piston 10 is therefore disposed within the rod recess 36 of the piston rod 9. The two guide strips 63 and the sealing ring 64 of the piston 10 lie against the piston guide surface 38 of the piston rod 9 so that they glide or can glide. In this connection, the piston 10 is disposed in such a manner that it is open toward the rod bottom wall 33. This means that the open piston end 50 faces the rod bottom wall 33. The closed piston end 49 and therefore the piston bottom wall 51 face away from the rod bottom wall 33.

As a result, the piston recess 53 and the rod recess 36 enclose or delimit a gas space 65, the volume of which is variable and depends on the position of the piston rod 9. The gas space 65 is filled with a gas that stands under pressure and acts as a gas Pressure spring. Filling takes Place by way of the filling channel 40. The piston 10 is connected to the piston rod 9 via the gas pressure spring. In other words, the piston 10 has force applied to it on one side by the gas pressure spring. The gas pressure spring thereby drives the piston 10, relative to the piston rod 9, in an outward piston movement direction 66 parallel to the longitudinal axis 11. The gas pressure spring therefore forces the piston 10 into it maximally moved-out position (FIG. 3, 5).

In the gas space 65, there is furthermore preferably a small amount of lubricant oil, in addition to the gas, in known manner. The lubricant oil gets into the interstice between the piston 10 and the piston rod 9 through the lubricant bores 62, and ensures sufficient lubrication of the piston guide.

The volume of the gas space 65 depends on the position of the piston 10 relative to the piston rod 9. In a maximally moved-out position of the piston 10 (FIG. 3, 5), the volume of the gas space 65 is maximal, and therefore the gas pressure or a spring force $F_Y$ that acts on the piston 10 and the piston rod 9 is minimal. In this position, the piston 10 lies against the bushing contact surface 48 with its piston contact surface 61. The bushing contact surface 48 therefore serves as a counter-bearing for the outward movement of the piston 10 out of the piston rod 9, in the outward piston movement direction 66. According to an essential aspect of the invention, the piston 10, in its maximally moved-out position, projects beyond the piston rod 9, viewed in the outward piston movement direction 66, by a specific amount. In other words, the piston 10 is no longer disposed completely but rather only partially within the piston rod 9 in its maximally moved-out position. Part of the piston 10 projects out of the piston rod 9. As a result, it is guaranteed, even when the piston rod 9 is maximally moved in, that a minimal overload path is present, as will be discussed in greater detail below.

Figure 4:
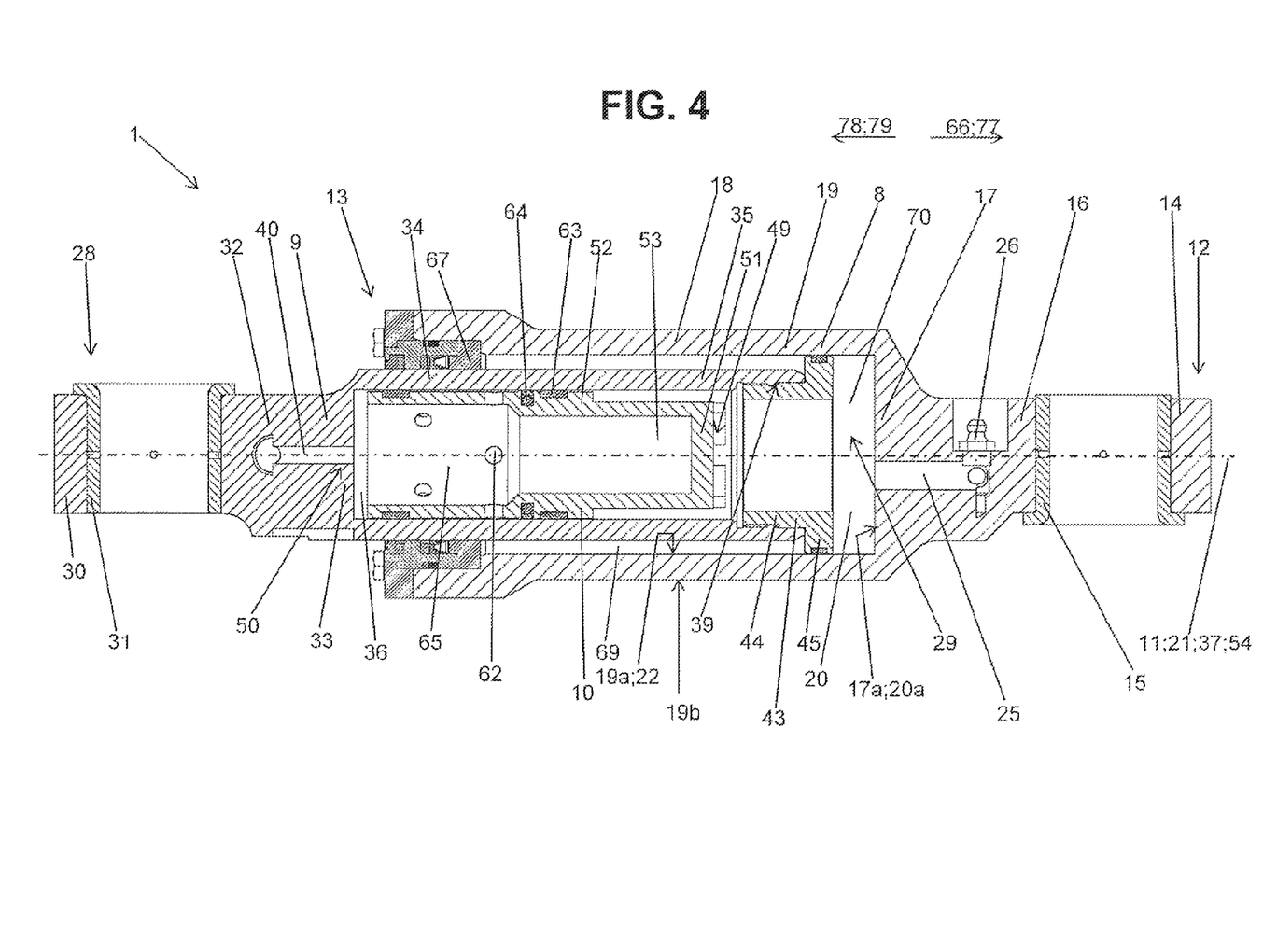
FIG. 4: A longitudinal section through the tensioning device according to FIG. 3, rotated by 90° as compared with FIG. 3, in the case of an overload

In a maximally moved-in position of the piston 10 (FIG. 4 shows the almost completely moved-in position), the volume of the gas space 65 is minimal, and therefore the gas pressure and the spring force $F_Y$ are maximal. In the position shown, the tube wall face surface 52c of the piston 10 is still at a slight distance from the recess bottom 36a of the rod recess 36. In the maximally moved-in position, it lies against the recess bottom 36a of the rod recess 36 (not shown). The piston 10 is then disposed completely within the piston rod 9, particularly the rod recess 36.

In the assembled state, the piston rod 9 is guided in the cylinder 18 telescoping in the direction of the longitudinal axis 11 by a limited amount, so as to be displaceable back and forth. Thereby, the piston rod 9 is partially disposed within the cylinder recess 20. In particular, the open rod end 29 is disposed within the cylinder recess 20. The guide bushing 43, particularly its upper collar surface 45a, is disposed to lie opposite the recess 20a of the cylinder recess 20. The attachment end 28 having the attachment eye 30 is disposed outside of the cylinder recess 20. The guide strip 46 of the guide bushing 43 lies against the piston rod guide surface 27 of the cylinder 18, and is guided so that it slides or can slide there. Furthermore, a cuff support 67 is present as a further guide element, which support is disposed at the open end 13 of the cylinder housing 8. The two-part cuff support 67 lies against the outer tube wall surface 35b of the rod wall 35, so that it slides or can slide there. Furthermore, a sealing ring 38 is present.

The piston rod 9 is therefore mounted or guided twice, in other words on two bearing points, in the cylinder 18. The two bearing points are spaced apart from one another in the axial direction. In this connection, the one bearing point, namely the one having the guide bushing 43, is fixed in place with reference to the piston rod 9. In contrast, the other bearing point, namely the one having the cuff support 67, is fixed in place with reference to the cylinder 18. Between the two bearing points, the piston rod 9 is spaced apart from the cylinder tube wall 19. In particular, a ring space 69 is present between the two bearing points and between the outer tube wall surface 35b of the rod wall 35 and the inner tube wall surface 19a of the cylinder tube wall 19. By being guided on two bearing points, the piston rod 9 is guided in stable and tilt-proof manner, and does not tend to tip.

Furthermore, a hydraulic space 70 is present within the cylinder recess 20, which space is completely filled with a hydraulic medium, and the volume of which is also variable. Filling of the hydraulic space 70 takes place by way of the filling channel 25. Preferably, the hydraulic medium is grease or oil. The hydraulic space 70 is delimited, on the one hand, by the cylinder recess 20, and, on the other hand, by the piston 10 and the piston rod 9. In particular, the piston 10 separates the gas space 65 from the hydraulic space 70, so that the piston 10 has force applied to it on one side by the gas pressure spring and on the other side by the hydraulic medium.

The volume of the hydraulic space 70 depends on the position of the piston rod 9 relative to the cylinder 18. It is greatest when the piston rod 9 is in its maximally moved-out position relative to the cylinder 18. This position is delimited in that the collar 45 comes up against the cuff support 67. The latter therefore serves as a counter-bearing for the movement of the piston rod in an outward piston movement direction 79. In this connection, the position of the piston rod 9 relative to the cylinder 18 or cylinder housing 8 establishes the length L (FIG. 3) of the tensioning device 1 according to the invention. The length L is the expanse of the tensioning device 1 in the direction of the longitudinal axis 11. The length L is furthermore specifically established in accordance with each application case. The length L is set during assembly. For this purpose, first the gas space 65 is filled with gas, so that the piston 10 is moved into its maximally moved-out position. The amount of gas is determined in accordance with the desired tensioning force $F_X$. In particular, as much gas is filled in so that the spring force $F_Y$ of the gas pressure spring, which is directed opposite to the tensioning force $F_X$, is at least as great, in terms of amount, as the tensioning force $F_X$. The following holds true: $F_Y \geq F_X$, preferably $F_Y > F_X$. This is particularly possible because the piston 10 is displaceable only by a limited amount, in other words cannot move further out of the piston rod 9 than its maximally moved-out position. This is what limits the maximal volume of the gas space 65, and the gas space 65 can be filled with so much gas that $F_Y > F_X$.

After the gas space 65 is filled, the desired length L of the tensioning device 1 is set by setting the position of the piston rod 9 in the cylinder 18. This is achieved by filling the hydraulic space 70. The piston rod 9 and the piston 10 are then rigidly connected with one another by way of the hydraulic medium. Here, rigidly means that a movement of the piston rod 9 always brings about movement of the piston 10, whereby the path that the two travel can be different, in terms of amount and direction.

The method of functioning of the tensioning device 1 according to the invention is now the following:

In normal operation, the tensioning device 1 applies the tensioning force $F_X$ to the component 2 to which force is to be applied, so that a corresponding counter-force $F_G$ acts on the piston rod 9 in the direction of the longitudinal axis 11. If the tensioning force $F_X$ becomes higher, in the case of an overload, the length L does not change until the tensioning force $F_X$ reaches the value $F_Y$. When the tensioning force $F_X$ exceeds the spring force $F_Y$, the piston rod 9 is moved further into the cylinder 18, in an inward piston rod movement direction 77, and in this connection displaces the hydraulic medium. The inward piston rod movement direction 77 is directed parallel to the longitudinal axis 11, and, in particular, in the same direction as the counter-force $F_G$. The total volume available for the gas and the hydraulic medium is thereby reduced. As a result, the piston 10 has force applied to it by the non-compressible hydraulic medium, and is forced or moved further into the piston rod 9, in an inward piston movement direction 78, so that the volume of the gas space 65 is reduced. The piston 10 and the piston rod 9 are therefore displaced in opposite directions. The inward piston movement direction 78 is parallel but in the opposite direction or opposite to the inward piston rod movement direction 77. By moving the piston 10 in, the gas is compressed and the spring force $F_Y$ increases.

The piston rod 9 continues to move into the cylinder 18 until $F_X = F_Y$. The path traveled by the piston rod 9 in the inward piston rod movement direction 77 is referred to as an overload path. In this connection, it is ensured, by means of the design according to the invention, that even with a piston rod 9 maximally moved in the starting position, in other words a minimal installation length of the tensioning device, a minimal overload path is always guaranteed. This is because, as has already been explained, the piston 10 is in its maximally moved-out position during assembly. In this position, however, the piston 10 projects beyond the piston rod 9 in the outward piston movement direction 66 that lies opposite to the inward piston movement direction 78. As a result, the contact elements 55 lie against the recess bottom 20a of the cylinder recess 20 in the minimal installation length. The guide bushing 43, however, is spaced apart from the recess bottom 20a by the amount of the excess length. And the amount of the excess length corresponds to the amount of the maximally possible overload path. The latter is limited by the fact that the collar 45 comes up against the inner bottom wall surface 17a of the cylinder bottom wall 17. The latter therefore serves, in this case, as a counter-bearing for the movement of the piston rod 9 in an inward piston rod movement direction 77. The farther the piston rod 9 has been moved out of the cylinder 18, in this connection, in its installation position, the greater the available overload path becomes. The amount of the overload path is therefore adjustable by way of the length of the tensioning device 1, whereby it is limited by the maximal stroke of the piston 10. A longer overload path can compensate greater interference from the outside than a shorter overload path, depending on the case.

As has been explained, the piston 10 and the piston rod 9 are displaced in opposite directions 77; 78 in the case of an overload. Because of this, the tensioning device 1 according to the invention has a very small minimal construction length. In this connection, the geometry of the tensioning device 1 is preferably designed in such a manner that the stroke of the piston 10, relative to the piston rod 9, is greater than the stroke of the piston rod 9 relative to the cylinder 18. This is necessary because the displaced volume of the piston rod 9 must find room when the rod moves into the bore of the gas piston 10. Because of the smaller diameter of the piston recess 53, a greater stroke of the gas piston 10 must take place than the stroke of the piston rod 9.

A significant difference of the embodiment according to the invention, in contrast to the tensioning device of EP 2 644 932 A1, is furthermore a reversal of the diameter or surface conditions of the two elements, the piston rod 9 and the gas piston 10. According to the invention, the diameter of the piston rod 9 is greater than the diameter of the piston 10. Because the piston rod diameter is greater than the gas piston diameter, the required hydraulic pressure for transferring force becomes less than in EP 2 644 932 A1, and as a result, the force on the gas piston becomes less than the external drive force. Reduction of the transfer pressure and of the force acting on the gas piston is very advantageous.

Of course, it also lies within the scope of the invention to use other attachment elements in place of the attachment eyes. Furthermore, it lies within the scope of the invention to use a helical spring in place of the pneumatic spring element.

The invention claimed is:

1. Tensioning device (1) for applying a tensioning force ($F_x$) to a component (2), having
    a) a longitudinal axis (11),
    b) a cylinder housing (8) having an axial cylinder recess (20) filled with a hydraulic medium,
    c) a piston rod (9) guided in the cylinder recess (20) telescoping in the direction of the longitudinal axis (11), so as to be displaceable back and forth, projecting out of the cylinder housing (8) at one end, wherein the piston rod (9) has an axial rod recess (36),
    d) a piston (10) guided in the rod recess (36), so as to be displaceable, back and forth, by a limited amount, in the direction of the longitudinal axis (11), from a moved-in position to a moved-out position,
    e) a pneumatic spring element, with which the piston (10) stands in connection, so that the piston can be driven in an outward piston movement direction (66) parallel to the longitudinal axis (11),
    wherein
    f) the piston has force applied to it on one side by the pneumatic spring element and on the other side by the hydraulic medium, in such a manner that inward movement of the piston rod (9) into the cylinder housing (8), along an overload path in the inward piston rod movement direction (77), brings about inward movement of the piston (10) into the piston rod (9), in an inward piston movement direction (78),
    g) the piston (10), in its moved-out position, projects beyond the piston rod (9) in the outward piston movement direction (66),
    h) the rod recess (36) and the piston (10) delimit a gas space (65) that is filled with a gas that stands under pressure, which forms the pneumatic spring element,
    i) the hydraulic medium is disposed within a hydraulic space (70) that is delimited by the cylinder recess (20), the piston (10), and the piston rod (9), wherein the piston (10) separates the gas space (65) from the hydraulic space (70),
    j) the cylinder housing (8) has a cylinder (18) that has a cylinder bottom wall (17), a cylinder tube wall (19), as well as the cylinder recess (20), wherein the cylinder bottom wall (17) and the cylinder tube wall (19) delimit the cylinder recess (20),
    k) the hydraulic space (70) has a hydraulic space volume dependent on a position of the piston rod (9) relative to the cylinder (18), the position of the cylinder (18) establishing a length (L) of the tensioning device (1) in the direction of the longitudinal axis (11), the length (L) and the hydraulic space volume being settable in accordance with a specific application case by filling the hydraulic space (70) with a necessary amount of the hydraulic medium for the application case, the gas space (65) being filled with a selected amount of gas to define a spring force of the pneumatic spring element, the length setting an amount of the overload path, a maximal possible overload path being limited by a maximal stroke of the piston (10), l) during operation, the gas space (65) is closed and has a gas space volume reduced by compressing the gas, m) the cylinder housing (8) has an attachment end (12) as well as an open housing end (13) that lies opposite to the former, in the direction of the longitudinal axis (11), wherein the cylinder recess (20) is open toward the open housing end (13) and is closed opposite to the open housing end (13), and has a recess bottom (20a), and n) the piston (10) has a guide bushing (43), a piston bottom wall (51) and a tubular piston wall (52), wherein the piston bottom wall (51) has an inner bottom wall surface (51a) and an outer bottom wall surface (51b), wherein the piston (10) has spacers (55) that follow the outer bottom wall surface (51b) of the piston bottom wall (51) and project away from the piston bottom wall, and wherein the spacers lie against the recess bottom (20a) of the cylinder recess (20) when the tensioning device has a minimal installation length in the moved-out position so as to ensure a specific minimal distance of the outer bottom wall surface (51b) of the piston bottom wall (51) from the recess bottom (20a) of the cylinder recess (20) and passage of the hydraulic medium into the cylinder recess (20).

2. Tensioning device (1) according to claim 1, wherein the piston rod (9) has a first counter-bearing (48) for the movement of the piston (10) in the outward piston movement direction (66).

3. Tensioning device (1) according to claim 2, wherein the piston (10) lies against the first counter-bearing (48) in its maximally moved-out position.

4. Tensioning device (1) according to claim 1, wherein the spring element supports itself, at the one end, on the piston (10), and, at the other end on the piston rod (9).

5. Tensioning device (1) according to claim 1, wherein the piston (10) has force applied to it by the spring element and by the hydraulic medium in such a manner that movement of the piston rod (9) into the cylinder housing (8) brings about compression of the spring element.

6. Tensioning device (1) according to claim 1, wherein the inward piston rod movement direction (77) and the inward piston movement direction (78) are parallel but opposite to one another.

7. Tensioning device (1) according to claim 1, wherein the piston (10) and the piston rod (9) are rigidly connected with one another via the hydraulic medium.

8. Tensioning device (1) according to claim 1, wherein the cylinder housing (8) has a filling channel (25) for filling and emptying the cylinder recess (20) with the hydraulic medium, wherein a closure and emptying screw (27) is present at an outer end of the filling channel (25).

9. Tensioning device (1) according to claim 8, wherein the closure and emptying screw (27) has a screw head (71) as well as a screw shaft (72) and a screw axis (73), wherein the screw shaft (72) has a channel line that ends in the surroundings of the closure and emptying screw (27), at a first end, at a free shaft end (72b) of the screw shaft (72), and ends in the surroundings of the closure and emptying screw (27) at a second end, below the screw head (71), at an outer shaft surface (72a).

10. Tensioning device (1) according to claim 9, wherein the closure and emptying screw (27) has a longitudinal channel (74) extending parallel to the screw axis (73), and at least one transverse channel (75) that extends perpendicular to it, wherein the longitudinal channel (74) extends from the free shaft end (72b) of the screw shaft (72) at least to the screw head (71), and the transverse channels (75) are disposed below the screw head (71), are connected with the longitudinal channel (74), and end in the surroundings of the closure and emptying screw (27) at the outer shaft surface (72a).

11. Tensioning device (1) according to claim 9, wherein the channel line ends at the first end in the filling channel.

12. Assembly having a component (2) and a tensioning device (1) according to claim 1, which applies a tensioning force ($F_x$) to the component (2), wherein a spring force ($F_y$) of the spring element of the tensioning device (1) is greater than or equal to the tensioning force ($F_x$).

13. Assembly according to claim 12, wherein the tensioning device (1) is connected with the component (2) at one end and with a supporting element (7) that is fixed in place relative to the component (2) at the other end.

14. Assembly according to claim 12, wherein the component is a press-down roller (3) or a deflection roller (4).

15. Tensioning device (1) according to claim 1, wherein the piston rod (9) has an attachment end (28) as well as an open rod end (29) that lies opposite to the former in the direction of the longitudinal axis (11), wherein the rod recess (36) is open toward the open rod end (28) and closed opposite to the open rod end (29), and has a recess bottom (36a).

16. Tensioning device (1) according to claim 1, wherein the piston rod (9) has a hollow rod (34) that has a rod bottom wall (33), a tubular rod wall (35), as well as the axial rod recess (36), wherein the rod bottom wall (33) and the tubular rod wall (35) delimit the rod recess (36).

17. Tensioning device (1) according to claim 1, wherein the piston (10) is configured to be cup-shaped, with a piston recess (53), and has a closed piston end (49) and an open piston end (50) that lies opposite to the former, viewed in the direction of the longitudinal axis (11), wherein the closed piston end (49) preferably faces the open rod end (29) of the piston rod (9).

18. Tensioning device (1) according to claim 2, further comprising a second counter-bearing (33a; 36a) for the movement of the piston (10) in the inward piston movement direction (78), opposite to the outward piston movement direction (66).

19. Tensioning device (1) according to claim 1, wherein the cylinder recess (20) and the rod recess (36) are each open on one side.

20. Tensioning device (1) for applying a tensioning force ($F_x$) to a component (2), having a) a longitudinal axis (11), b) a cylinder housing (8) having an axial cylinder recess (20) filled with a hydraulic medium, c) a piston rod (9) guided in the cylinder recess (20) telescoping in the direction of the longitudinal axis (11), so as to be displaceable back and forth, projecting out of the cylinder housing (8) at one end, wherein the piston rod (9) has an axial rod recess (36), d) a piston (10) guided in the rod recess (36), so as to be displaceable, back and forth, by a limited amount, in the direction of the longitudinal axis (11), from a moved-in position to a moved-out position, e) a pneumatic spring element, with which the piston (10) stands in connection, so that the piston can be driven in an outward piston movement direction (66) parallel to the longitudinal axis (11), wherein f) the piston has force applied to it on one side by the pneumatic spring element and on the other side by the hydraulic medium, in such a manner that inward movement of the piston rod (9) into the cylinder housing (8), along an overload path in the inward piston rod movement direction (77), brings about inward movement of the piston (10) into the piston rod (9), in an inward piston movement direction (78), g) the piston (10), in its moved-out position, projects beyond the piston rod (9) in the outward piston movement direction (66), h) the cylinder housing (8) has a filling channel (25) for filling and emptying the cylinder recess (20) with the hydraulic medium, wherein a closure and emptying screw (27) is present at an outer end of the filling channel (25), and i) the closure and emptying screw (27) has a screw head (71) as well as a screw shaft (72) and a screw axis (73), wherein the screw shaft (72) has a channel line that ends in the surroundings of the closure and emptying screw (27), at a first end, at a free shaft end (72*b*) of the screw shaft (72), and ends in the surroundings of the closure and emptying screw (27) at a second end, below the screw head (71), at an outer shaft surface (72*a*).

21. Tensioning device (1) according to claim 20, wherein the closure and emptying screw (27) has a longitudinal channel (74) extending parallel to the screw axis (73), and at least one transverse channel (75) that extends perpendicular to it, wherein the longitudinal channel (74) extends from the free shaft end (72*b*) of the screw shaft (72) at least to the screw head (71), and the transverse channels (75) are disposed below the screw head (71), are connected with the longitudinal channel (74), and end in the surroundings of the closure and emptying screw (27) at the outer shaft surface (72*a*).

22. Tensioning device (1) according to claim 20, wherein the channel line ends at the first end in the filling channel.

* * * * *